No. 773,440. PATENTED OCT. 25, 1904.
P. C. ULMEN.
VENTILATOR.
APPLICATION FILED JULY 9, 1904.
NO MODEL. 3 SHEETS—SHEET 1.

Witnesses
Inventor
P. C. Ulmen
Attorneys

No. 773,440. PATENTED OCT. 25, 1904.
P. C. ULMEN.
VENTILATOR.
APPLICATION FILED JULY 9, 1904.
NO MODEL. 3 SHEETS—SHEET 2.
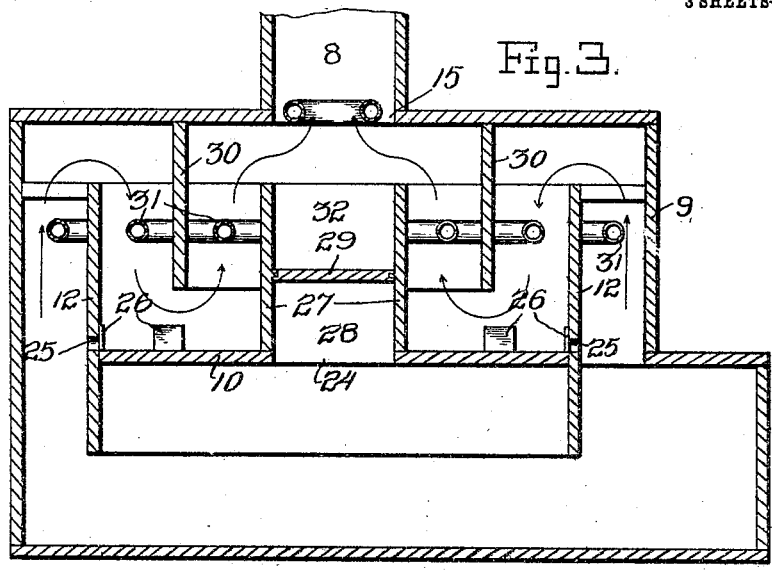
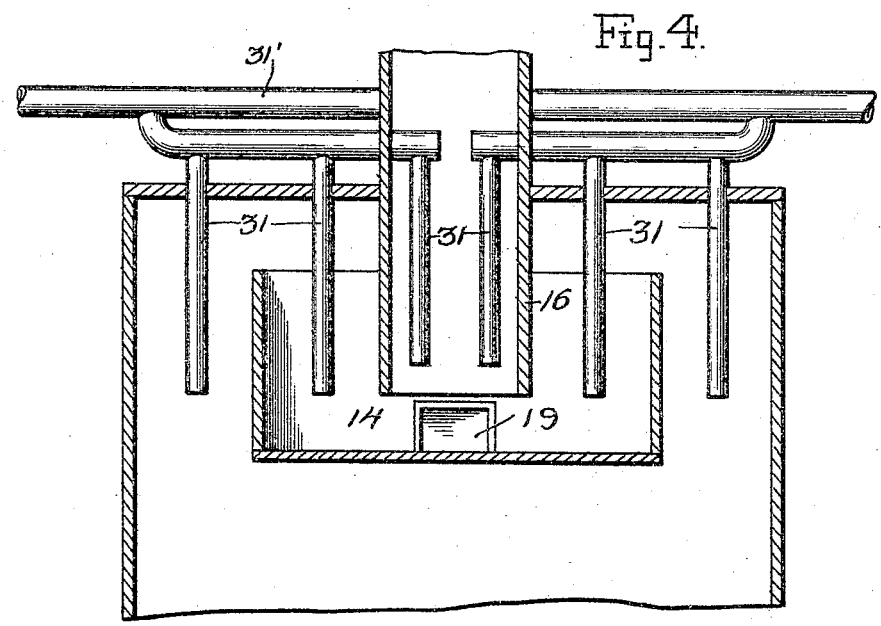
Witnesses
Inventor
P. C. Ulmen.
by
Chandlee & Chandlee
Attorneys No. 773,440. PATENTED OCT. 25, 1904.
P. C. ULMEN.
VENTILATOR.
APPLICATION FILED JULY 9, 1904.
NO MODEL. 3 SHEETS—SHEET 3.
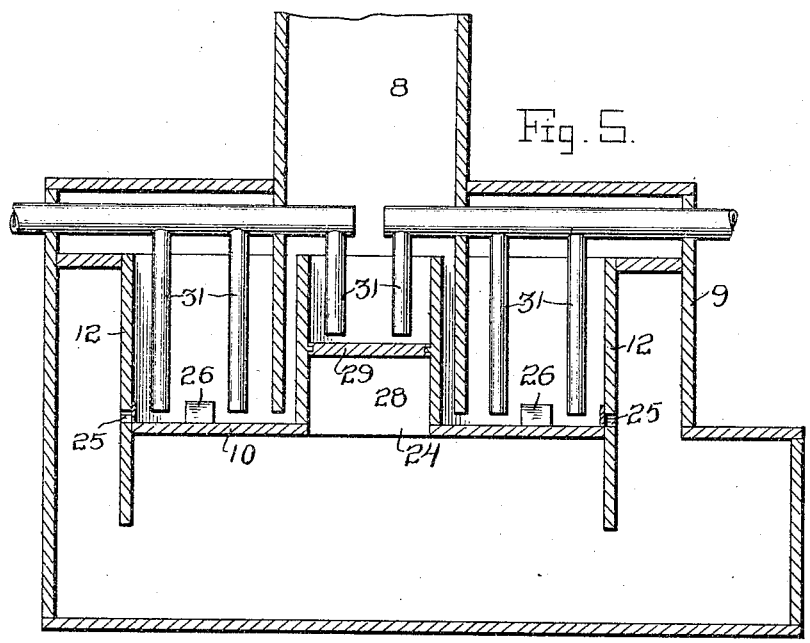

No. 773,440.

Patented October 25, 1904.

UNITED STATES PATENT OFFICE.

PHILIP C. ULMEN, OF MUSKEGON, MICHIGAN.

VENTILATOR.

SPECIFICATION forming part of Letters Patent No. 773,440, dated October 25, 1904.

Application filed July 9, 1904. Serial No. 215,849. (No model.)

*To all whom it may concern:*

Be it known that I, PHILIP C. ULMEN, a citizen of the United States, residing at Muskegon, in the county of Muskegon, State of Michigan, have invented certain new and useful Improvements in Ventilators; and I do hereby declare the following to be a full, clear, and exact description of the invention, such as will enable others skilled in the art to which it appertains to make and use the same.

This invention relates to ventilators for the blow-pits of pulp-digesters, and has for its object to provide a ventilator so arranged that the passage of stock from the blow-pit out through the discharge-opening of the ventilator will be prevented.

Other objects and advantages will be apparent from the following description, and it will be understood that modifications of the specific construction shown may be made and any suitable materials may be used without departing from the spirit of the invention.

Figure 1:
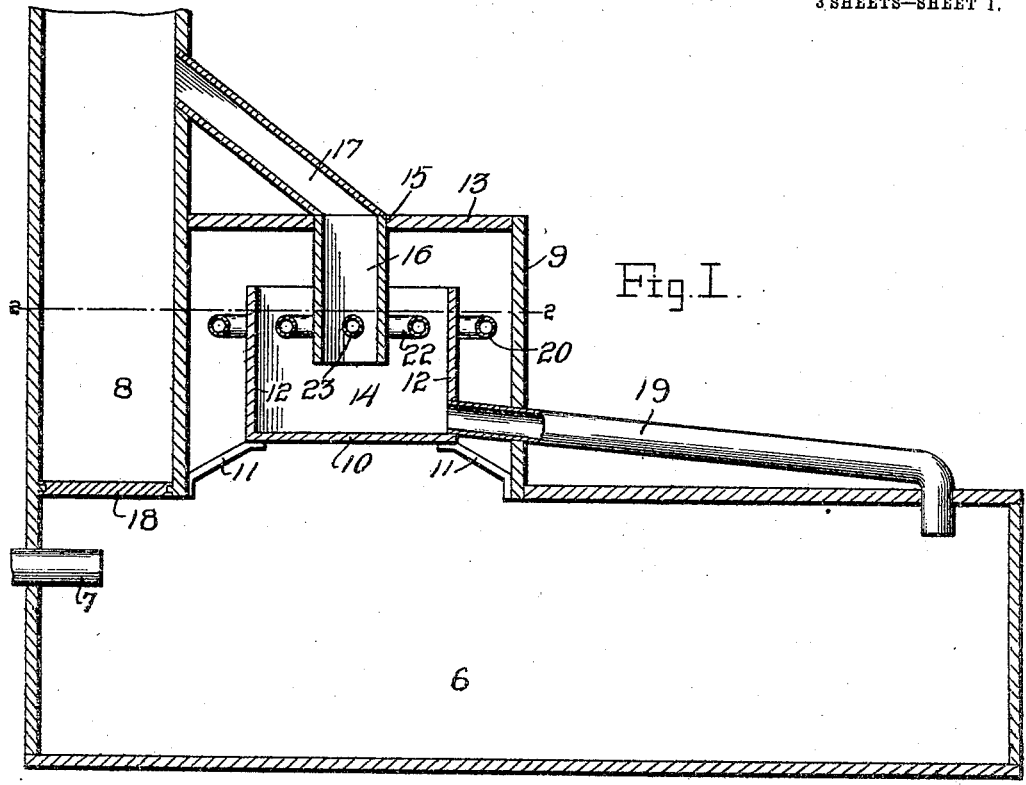
Figure 2:
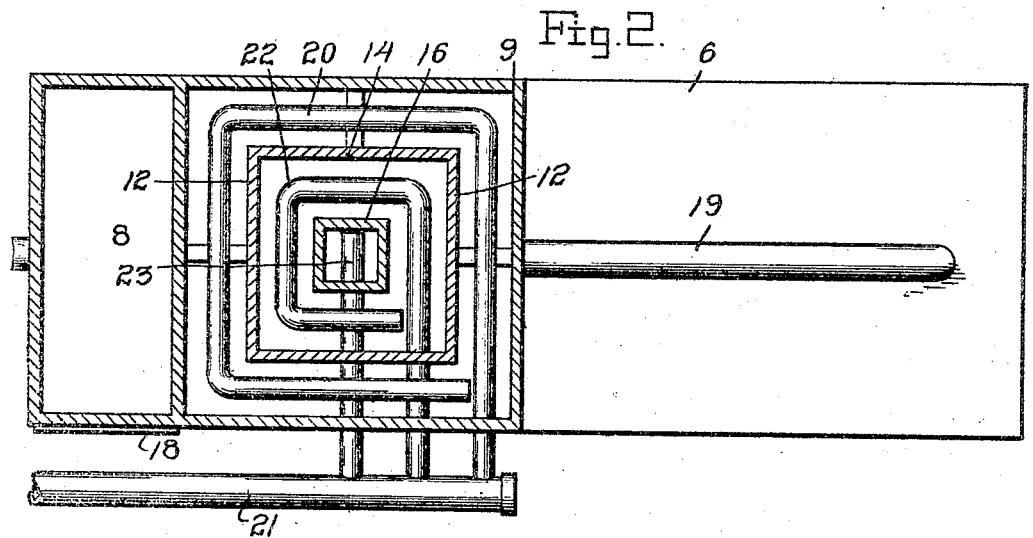

In the drawings forming a portion of this specification, and in which like numerals of reference indicate similar parts in the several views, Figure 1 is a longitudinal section through the present invention and an old form of blow-pit to which it is applied. Fig. 2 is a section on line 2 2 of Fig. 1. Fig. 3 is a longitudinal section of a modified form of the invention. Fig. 4 is a view similar to Fig. 3, showing a further modification. Fig. 5 is a view showing a construction in which certain features of the other forms are combined.

Referring now to the drawings, in Fig. 1 there is shown the blow-pit 6 of a digester having the blowpipe 7, through which steam is admitted to the pit, and in the usual form of these pits the outlet-passage 8 communicates therewith and extends upwardly for the passage of the steam and the gases thrown off by the stock which is disposed within the pit.

The present invention lies in the upwardly-extending compartment 9, which communicates with the pit and which has a platform 10 disposed concentrically therewith and spaced at its edges from the inner faces of the walls of the compartment, the platform being supported by brackets 11, as shown.

Extending upwardly from the edges of the platform 10 are walls 12, which are spaced from the top 13 of the compartment, these walls forming a receptacle 14 open at its top, and formed through the top 13 of the compartment is an opening 15, from which there depends an open-ended trunk 16, the lower end of which lies within the receptacle 14 and spaced from the bottom thereof.

Extending upwardly from the opening 15 is a pipe 17, which communicates with the outlet-passage 8 mentioned above, the lower end of this passage 8 being closed by a removable slide 18, as shown. Communicating with the receptacle 14 is an outlet-pipe 19, which also communicates with the blow-pit 6.

Surrounding the receptacle 14 and lying in the space between this receptacle and the walls of the compartment 9 is a perforated spray-pipe 20, which is connected with a water-supply pipe 21, and disposed within the receptacle 14, and surrounding the trunk 16 is a similar spray-pipe 22, while a third pipe 23 is disposed within the trunk and is perforated, as shown, both the pipes 22 and 23 being connected with the water-supply pipe 21.

In use the stock to be treated is disposed in the pit 6 and steam is admitted through the pipe 7, which rises through the space between the receptacle 14 and the walls of the compartment 9, then passing downwardly within the receptacle and upwardly through the trunk 16 and the pipe 17 to the passage 8. In following this course the steam and the gases from the stock pass through the veils of water from the pipes 20, 22, and 23, which precipitates any of the stock carried by the steam, this stock either falling into the blow-pit or into the receptacle 14, from which it passes through the pipe 19 into the blow-pit.

Any of the stock which might be carried through the pipe 17 to the passage 8 and which falls upon the slide 18 may be returned to the pit 6 by removing this slide.

In Fig. 3 there is shown a construction in which the compartment 9 is somewhat enlarged and which is provided at its top with the opening 15, communicating in this instance directly with the outlet-passage 8, the platform 10 being disposed centrally below the opening 15 and having an opening 24 therethrough with which the opening 15 alines. Extending upwardly from the edges of the platform 10 are the walls 12, provided with openings 25, having closures 26, these openings communicating with the space between the walls 12 and the walls of the compartment 9.

Extending upwardly from the platform 10 at the sides of the opening 24 are the walls 27 of a trunk 28, provided with a sliding closure 29, and these walls 27 are spaced from the top of the compartment 9, as shown, and lie flush with the upper ends of the walls 12. Depending from the top of the compartment and extending downwardly between the walls 12 and 27 are baffle-plates 30, which are connected at their ends, and there is thus formed a tortuous passage for the steam, &c., from the pit 6 to the passage 8, this passage being indicated by arrows, and in this passage are disposed a plurality of spray-pipes 31, which are connected with a water-supply pipe, as in the first-described form.

The sliding closure 29 is disposed somewhat below the upper ends of the walls 27, so that there is formed a receptacle 32 within the receptacle 14 formed by the walls 12, and it will be apparent that this receptacle 32 and the receptacle 14 are disposed to receive the stock precipitated by the veils of water from the pipes 31, this precipitated stock passing from the receptacle 14 to the pit 6 through the openings 25, the closures 26 being opened to permit of such passage, and it will also be apparent that the stock deposited upon the closure 29 may be returned to the pit by drawing this closure.

In Fig. 4 there is shown a further modification, similar in construction to that shown in Fig. 3. In this form the trunk 28 is omitted and the outlet-pipe 10 communicates with the receptacle 14 and is arranged as shown in Fig. 1. In this construction also the trunk 16 (shown in Fig. 1) is substituted for the baffle-plates 30, and the spray-pipes 31 instead of extending horizontally, as in the other form, are disposed vertically between the walls and the walls of the compartment 9 and between the walls and the trunk 16, similar pipes being disposed within the trunk and the several pipes being connected with water-supply pipes 31', which are disposed above the compartment 9.

In Fig. 5 there is shown a construction in which the principal features of the three forms just described are combined, as will be readily understood.

What is claimed is—

1. In a device of the class described, the combination with a blow-pit and a steam-supply connected therewith, of a compartment disposed above the pit and communicating therewith at its bottom, a receptacle disposed within the compartment and spaced from the sides and top thereof, said compartment having an opening in its top, an outlet-pipe communicating with the opening, and connected walls secured to the top and depending therefrom and surrounding the opening, said walls extending into the receptacle to form a tortuous passage from the pit to the outlet-pipe, and spray-pipes disposed within the passage and connected with a water-supply, said receptacle communicating with the pit for the passage of stock therefrom to the pit.

2. The combination with a blow-pit for pulp-digesters, said blow-pit having an outlet-passage communicating therewith and a steam-supply, of a compartment disposed above the pit and communicating at its bottom therewith, said compartment having an opening in its top, a pipe communicating with the opening and with the outlet-passage, a receptacle disposed within the compartment and spaced from the top and sides thereof, a trunk depending from the top of the compartment and surrounding the opening therein and extending into the receptacle and spaced from the bottom thereof to form a tortuous passage from the pit to the opening, spray-pipes disposed in said passage and connected with the water-supply, and a pipe at one end communicating with the receptacle, at its remaining end with the pit for the passage of precipitated stock from the receptacle to the pit, and a removable closure disposed in the outlet-passage below the communication of the first-named pipe therewith.

In testimony whereof I affix my signature in presence of two witnesses.

PHILIP C. ULMEN.

Witnesses:
GEORGE T. McCOMB,
WM. W. BARCUS.